United States Patent [19]

Auchterlonie

[11] Patent Number: 4,501,002
[45] Date of Patent: Feb. 19, 1985

[54] OFFSET QPSK DEMODULATOR AND RECEIVER

[76] Inventor: Richard C. Auchterlonie, 5701 N. Sheridan #29-Q, Chicago, Ill. 60660

[21] Appl. No.: 470,053

[22] Filed: Feb. 28, 1983

[51] Int. Cl.³ .................. H04L 27/22; H03D 3/02
[52] U.S. Cl. .................... 375/86; 375/77; 329/124
[58] Field of Search ........... 375/53, 86, 111, 118.81, 375/77, 52, 54, 83; 329/50, 122, 124

[56] References Cited

U.S. PATENT DOCUMENTS

| | | | |
|---|---|---|---|
| 3,101,448 | 8/1963 | Costas | 329/50 |
| 3,368,036 | 2/1968 | Carter et al. | |
| 3,403,355 | 9/1968 | Takada | |
| 3,568,067 | 3/1971 | Williford | 329/124 X |
| 3,818,347 | 6/1974 | Holsinger | 375/81 |
| 3,993,956 | 11/1976 | Gilmore et al. | |
| 4,085,378 | 4/1978 | Ryan et al. | 329/124 |
| 4,092,606 | 5/1978 | Ryan | 375/86 |
| 4,100,499 | 7/1978 | Monrolin | 375/81 |
| 4,313,205 | 1/1982 | Rhodes | 375/86 |
| 4,348,641 | 9/1982 | Scott et al. | 329/50 |
| 4,392,232 | 7/1983 | Andren et al. | 375/86 |

OTHER PUBLICATIONS

Mathwich et al., "The Effect of Tandem Band and Amplitude Limiting on the Eb/No Performance of Minimum (Frequency) Shift Keying (MSK)", *IEEE Transactions on Communications*, vol. COM-22, No. 10, Oct. 1974, pp. 1525–1539.
Simon and Smith, "Offset Quadrature Communications with Decision Feedback Carrier Synchronization", *IEEE Transactions on Communications*, vol. COM-22, No. 10, Oct. 1974, pp. 1576–1584.
Gawler, "Frequency Converters and Detectors", *Electronics Engineers' Handbook*, 2nd ed., (McGraw-Hill, N.Y., 1982), pp. 14–63.

Primary Examiner—Jin F. Ng
Attorney, Agent, or Firm—R. C. Auchterlonie

[57] ABSTRACT

An offset QPSK demodulator samples inphase and quadraphase channels at the data rate and derives carrier phase and clock phase control signals even if the samples are hard limited. The demodulator may be fabricated as a low cost integrated circuit. In one embodiment, a data clock having a 50% duty cycle clocks D flip-flops to store inphase data samples and quadraphase control samples upon rising clock transitions, and to store inphase control samples and quadraphase data samples upon falling clock transitions. To generate a tristate carrier phase control signal, an inphase exclusive-OR gate compares the inphase control samples to the complement of the quadraphase data samples, and a quadraphase exclusive-OR gate compares the quadraphase control samples to the inphase data samples. To generate a tristate clock phase control signal, an inphase exclusive-OR gate compares the inphase control samples to the inphase data samples, and a quadraphase exclusive-OR gate compares the quadraphase control samples to the quadraphase data samples. Transition-detecting D flip-flops and exclusive-OR gates enable the outputs of the respective control signal-generating exclusive-OR gates to assert active tristate signals for one-half data bit periods only when there is a transition in the data samples of the respective channel. The transition-indicating signals are logically ORed to provide differentially decoded data.

20 Claims, 3 Drawing Figures

OFFSET QPSK DEMODULATOR AND RECEIVER

BACKGROUND OF THE INVENTION

This invention relates to a demodulator or receiver for digital data transmission. Specifically, the invention is an offset QPSK demodulator and digital receiver suitable for low cost implementation using digital integrated circuit techniques. Applications involve remote control, scrambled digitized speech and secure data transmission.

QPSK, or quadriphase shift keying, has been recognized as an efficient format for transmitting digital data, both in terms of reduced bandwidth and minimum transmitter power. The bandwidth requirements are less than for phase shift keyed (PSK) modulation, and are generally better than frequency shift keyed (FSK) modulation.

Offset QPSK in particular is equivalent to minimum frequency shift keying (MSK) which is an "optimal" format for FSK. See Mathwich et al., "The Effect of Tandem Band and Amplitude Limiting on the Eb/No Performance of Minimum (Frequency) Shift Keying (MSK), "IEEE Transactions on Communications, Vol. COM-22, No. 10, October 1974, pp. 1525-39. Offset QPSK has the advantage that, unlike conventional QPSK, filtered offset QPSK retains its band-limited spectrum after handlimiting. In other words, even though offset QPSK may be generated and demodulated using linear and synchronous techniques, it is fully compatible with Class C amplifiers and FM radio RF circuits. See Simon & Smith, "Offset Quadrature Communications with Decision Feedback Carrier Synchronization," IEEE Transactions on Communications, Vol. COM-22, No. 10, October 1974, pp. 1576-84.

There are two popular circuits for demodulating offset QPSK, characterized by the method used for obtaining a coherent phase reference corresponding to the suppressed carrier. These circuits are known as the times four/divide by four and the Costas or data estimation loop. In the times four/divide by four loop, a replica of the received QPSK signal is frequency multiplied by four and mixed with the coherent reference which is also multiplied by four. The mixer devices an output signal which is coupled through a low pass filter to control the frequency of the coherent reference. By frequency multiplying the coherent reference by four in a feedback loop, there is effectively a frequency division by four to the multiplier from the receiver. The divide by four circuit is usually a phase locked loop with a loop bandwidth of 0.1% to 1% of the data rate. See Rhodes, U.S. Pat. No. 4,313,205 (Jan. 26, 1982).

In the data estimation loop, a Costas loop is formed by supplying the output signals of the orthogonal channel low pass filters to separate hard limiters. The output signals of the hard limiters are cross multiplied with the output signals of the low pass filters to derive estimates of the transmitted data. The estimates are compared to derive an error signal that is coupled to a loop filter, which in turn controls the phase of the coherent reference. See Ryan et al. U.S. Pat. No. 4,085,378 issued Apr. 18, 1978, and Ryan U.S. Pat. No. 4,092,606 issued May 30, 1978.

Although the prior art circuits perform their intended function of demodulating offset QPSK, they require analog multipliers and associated circuits which do not lend themselves to low cost integrated circuit implementation. For the effective bandwidth of the times four/divide by four or the Costas loop to be relatively independent of received signal level, automatic gain control is also required.

SUMMARY OF THE INVENTION

The general aim of the present invention is to provide an offset QPSK demodulator and receiver suitable for low cost integrated circuit implementation.

Another object of the invention is to provide an offset QPSK demodulator which derives both carrier phase and data or symbol phase control signals from hard limited inphase and quadraphase channels so that automatic gain control is not required.

Still another object is to provide an MSK receiver which also may employ spread spectrum techniques so that the channel has increased immunity to continuous wave (CW) interference.

Yet another object of the invention is to provide an improved hybrid and balanced modulator circuit for deriving the inphase and quadraphase channels.

And still another object of the invention is to provide an economical method and system for transmitting in excess of 10 kilobits per second of remote control, paging, or scrambled digitized speech data within less than the 10 kilohertz bandwidth of conventional mobile or point-to-point FM communication channels, the method and system being compatible with existing class C FM transmitters.

The foregoing and other objects are achieved in accordance with the present invention by providing a digital demodulator which samples both the inphase and the quadraphase channels at the data rate. The "control" samples between the "data" samples are processed to derive both carrier phase and data or symbol phase control or error signals. If the "data" samples immediately preceding and immediately following a "control" sample differ in their logic state, (it being assumed that the "data" samples are hard limited to a logical 0 or a logical 1), a carrier phase control signal is generated from the "control" sample by conditionally reversing the sign or polarity of the "control" sample depending on the logic state of the "data" sample from the other channel sampled coincident with the "control" sample, and a data or symbol phase control signal is generated from the "control" sample by conditionally reversing the sign or polarity of the "control" sample depending on the direction of the transition between the "data" samples immediately preceding and immediately following the "control" sample. This demodulation method is operative even if the "control" samples are hard limited. In this case, although there is a high probability that for each "control" sample generating control signals, one of the control signals will be erroneous, the control signals will drive the carrier phase and data or symbol phase loops in a cooperative fashion so that both carrier phase and data or symbol phase are acquired.

In one preferred embodiment suitable for high speed data communication, D type flip-flops perform the sampling, exclusive-OR gates provide the conditional polarity or sign reversal, and tristate drivers are enabled to activate the phase control signal outputs only upon transitions of the "data" samples.

In another preferred embodiment for low data rate applications such as remote control, a microcomputer being interrupted at the data rate by a programmable timer or counter has sufficient time to perform the demodulation process. The programmable timer or counter provides a phase-controlled data clock, and a crystal oscillator pulled by a varactor driven by a "type-II" loop filter provides a phase-controlled local oscillator. The quadrature phase relation of the inphase and quadraphase channels is ensured by a hybrid and balanced modulator circuit using a center tapped or balanced RF or IF transformer and a ring of four switching elements such as MOS FETS; individual ones of the four switching elements are sequentially enabled by respective decoded outputs of a counter clocked at twice the frequency of the suppressed carrier. If a two-stage binary counter is used, an exclusive-OR gate may be inserted between the binary counter and the decoder so that a pseudorandom sequence can effectively modulate the suppressed carrier to permit the reception of spread spectrum offset QPSK.

BRIEF DESCRIPTION OF THE DRAWINGS

Other objects and advantages of the invention will become apparent upon reading the following detailed description and upon reference to the drawings in which.

Figure 1:
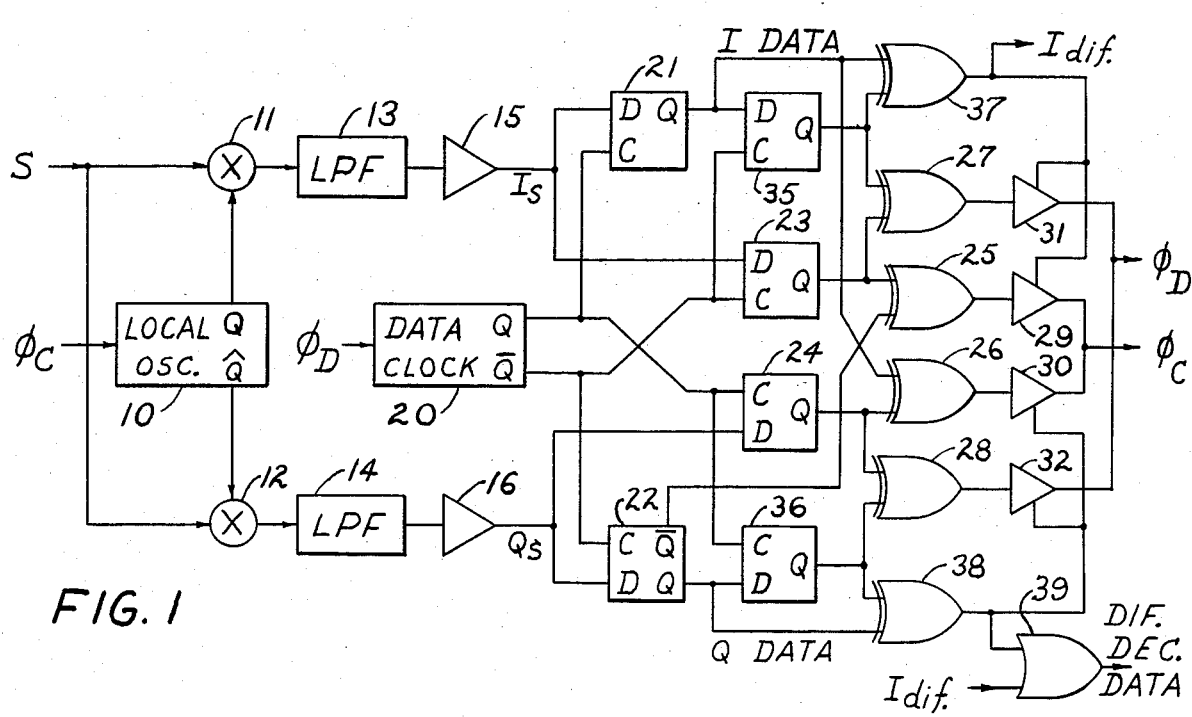
FIG. 1 is a schematic diagram of one embodiment of the demodulator according to the present invention.

While the invention is susceptible of various modifications and alternative constructions, certain preferred embodiments have been shown in the drawings and will be described below in considerable detail. It should be understood, however, that there is no intention to be limited to the specific forms described but, on the contrary, the intention is to cover all modifications, alternative constructions and equivalents falling within the spirit and scope of the claims.

DESCRIPTION OF PREFERRED EMBODIMENTS

Turning now to the drawings, there is shown in FIG. 1 a schematic diagram of one embodiment of an offset QPSK demodulator according to the present invention. The demodulator receives the QPSK signal S which is, for example, mathematically described as:

$$S = I \cos(wt) + Q \sin(wt)$$

where w is the frequency of the suppressed carrier in radians per second. The I and Q signals are band-limited binary data signals. In order to detect the I and Q signals, the demodulator has the conventional local oscillator (10) receiving a variable frequency or phase control signal $\phi_C$. The local oscillator (10) is shown having hybrid outputs Q and $\bar{Q}$ in phase quadrature, for example cosine and sine signals respectively. Conventional modulators (11), (12) effectively multiply the hybrid outputs Q and $\bar{Q}$ by the QPSK signal S, and the desired product terms are selected by respective conventional inphase and quadraphase channel low pass filters (13), (14). In the embodiment shown in FIG. 1, conventional limiters (15), (16) generate hard limited I and Q signals respectively designated $I_S$ and $Q_S$. A data oscillator or clock (20) receiving a variable frequency or phase control signal $\phi_D$ generates a data clock signal CLOCK, shown in FIG. 2. (The signal CLOCK is the positive or Q output of the data clock 20.) Positive edge-triggered D type flip-flops (21), (22) sample the respective hard limited data signals $I_S$, $Q_S$ at the proper times to regenerate respective binary data streams I DATA, Q DATA estimating the transmitted data. The inphase data stream I DATA is obtained by sampling $I_S$ upon the leading or positive transitions of the CLOCK signal, while the quadraphase data stream Q DATA is obtained by sampling $Q_S$ upon the falling or negative transitions of the CLOCK signal. Thus the inphase and quadraphase data are offset from each other.

The above-described offset QPSK demodulation process assumes that the local oscillator (10) is phase-locked to the suppressed carrier and that the data clock (20) is phase-locked to the sequence of data symbols encoded in the data signals I and Q. According to an important aspect of the present invention, the phase control signals $\phi_C$, $\phi_D$ required for acquiring and maintaining carrier and data or symbol phase-lock are obtained by sampling both the I and Q signals at the data rate, rather than just half the total data rate. Note that the I and Q signals are each sampled at half the total data rate to obtain the "data" samples I DATA, Q DATA. The additional sampling is performed by D type filp-flops (23), (24), which sample the I signal $I_S$ and the Q signal $Q_S$, respectively. The inphase "control" samples are sampled by the flip-flop (23) coincident with the negative transitions of the CLOCK signal, while the quadraphase "control" samples are sampled by the flop-flop (24) coincident with the positive transitions of the CLOCK signal. The D flip-flops (23), (24) function as one-bit digital samplers by analogy to analog-to-digital converters which function as multiple-bit digital samplers. Thus associated with each "control" sample is a coincident "data" sample from the other channel, and an immediately preceding "data" sample and an immediately following "data" sample from the same channel.

The applicant has discovered that when there is a logic transition between the "data" samples immediately preceding and immediately following a "control" sample, the value of the "control" sample is correlated with the "data" sample immediately preceding or immediately following the "control" sample to an extent generally proportional to the data or symbol phase error, and the value of the "control" sample is correlated with the "data" sample (from the other channel) coincident with the "control" sample to an extent generally proportional to the carrier phase error. The sign of the correlation indicating carrier phase error, however, is different depending on whether the "control" sample is an inphase or quadraphase sample, since a relatively small local oscillator phase lag effectively "counter-clockwise rotates" transmitted I partially into received Q but partially "rotates" transmitted Q into received $-I$. Even if the "control" samples are hard limited, there is sufficient correlation to estimate the carrier and data or symbol phase errors so that carrier phase and data or symbol phase may be acquired and phase-lock maintained.

According to an important aspect of the invention, if there is a logic transition between the "data" samples immediately preceding and immediately following a "control" sample, the carrier phase error or control signal is generated from the "control" sample by conditionally reversing the sign or polarity of the "control" sample depending on the logic state of the "data" sample (from the other channel) coincident with the "control" sample (with reversals occurring upon different data polarity depending on whether the "data" sample is from the inphase or quadraphase channel), and the data or symbol phase error or control signal is generated from the "control" sample by conditionally reversing the sign or polarity of the "control" sample depending on the direction of the transition between the "data" samples immediately preceding and immediately following the control sample (the direction being obtainable from the logic state of either the preceding or following "data" sample). In the embodiment shown in FIG. 1, for inphase "control" samples an exclusive-OR gate (25) conditionally reverses the sign or polarity of the "control" sample depending on the logic state of the complement $\overline{Q}$ of the coincident quadraphase "data" sample, while for the quadraphase "control" samples an exclusive-OR gate (26) conditionally reverses the sign or polarity of the "control" sample depending on the logic state of the coincident inphase "data" sample. An exclusive-OR gate (27) conditionally reverses the sign or polarity of inphase "control" samples depending on the direction of any inphase data transitions as detected from the logic state of the immediately preceding "data" sample, and similarly an exclusive-OR gate (28) conditionally reverses the sign or polarity of quadraphase "control" samples depending on the direction of any quadraphase data transitions as detected by the logic state of the immediately preceding "data" sample. The "control" samples with conditionally reversed sign or polarity are fed to the carrier phase $\phi_C$ and data or symbol phase $\phi_D$ error or control outputs through a set of four tristate drivers, charge pumps or transmission gates (29), (30), (31), (32) receiving the outputs of the exclusive-OR gates (25), (26), (27), (28), respectively. Note that the outputs of the tristate drivers (19) and (30) are combined in wired-OR fashion to generate the carrier phase error or control signal $\phi_C$, and the outputs of tristate drivers (31) and (32) are also combined in wired-OR fashion to generate the data or symbol phase error or control signal $\phi_D$.

The pairs of tristate drivers (29), (31) and (30), (32) are enabled to generate active phase error or control signals only upon the occurrence of transitions in the inphase data and quadraphase data, respectively. Inphase data transitions are detected by a D flip-flop (35) and an exclusive-OR gate (37), and quadraphase data transitions are also detected by a D flip-flop (36) and an exclusive-OR gate (38). Note that the D flip-flop (35) is clocked by the inverted data clock $\overline{Q}$ while the D flip-flop (36) is clocked by the noninverted data clock Q, in contrast to the respective preceding flip-flops (21) and (22) so that the D flip-flops (35), (36) provide an effective delay of one-half clock period. This one-half delay assures that there is no contention between the wired-OR tristate driver pairs (29), (30) and (31), (32).

Figure 2:
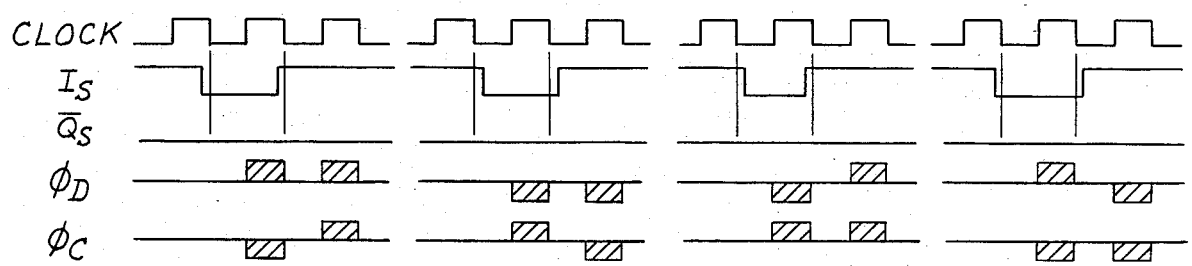
FIG. 2 is a timing diagram illustrating that the embodiment of FIG. 1 can simultaneously acquire carrier phase and data or symbol phase.

FIG. 2 illustrates the data phase $\phi_D$ and carrier phase $\phi_C$ control signals generated by the demodulator of FIG. 1 for the case of transitions in the inphase data only and $Q_S$ being high or a logical 1 ($\overline{Q_S}$ being low). Positive or "upward" tristate pulses in $\phi_D$ indicate that the phase of the data clock (20) is delayed and thus the data clock frequency should be temporarily increased. Positive tristate pulses in $\phi_C$ indicate that the phase of the local oscillator (10) is delayed and thus the frequency of the local oscillator should be temporarily increased. The tristate signals are shown as pulses since the area, eithr positive or negative, of the pulses is integrated by the loop filters in the local oscillator (10) and data clock (20) to specify their phase or frequency. The pulses, for example, may denote current sourced to or sinked from integrating capacitors across which frequency or phase control voltages are generated.

Figure 3:
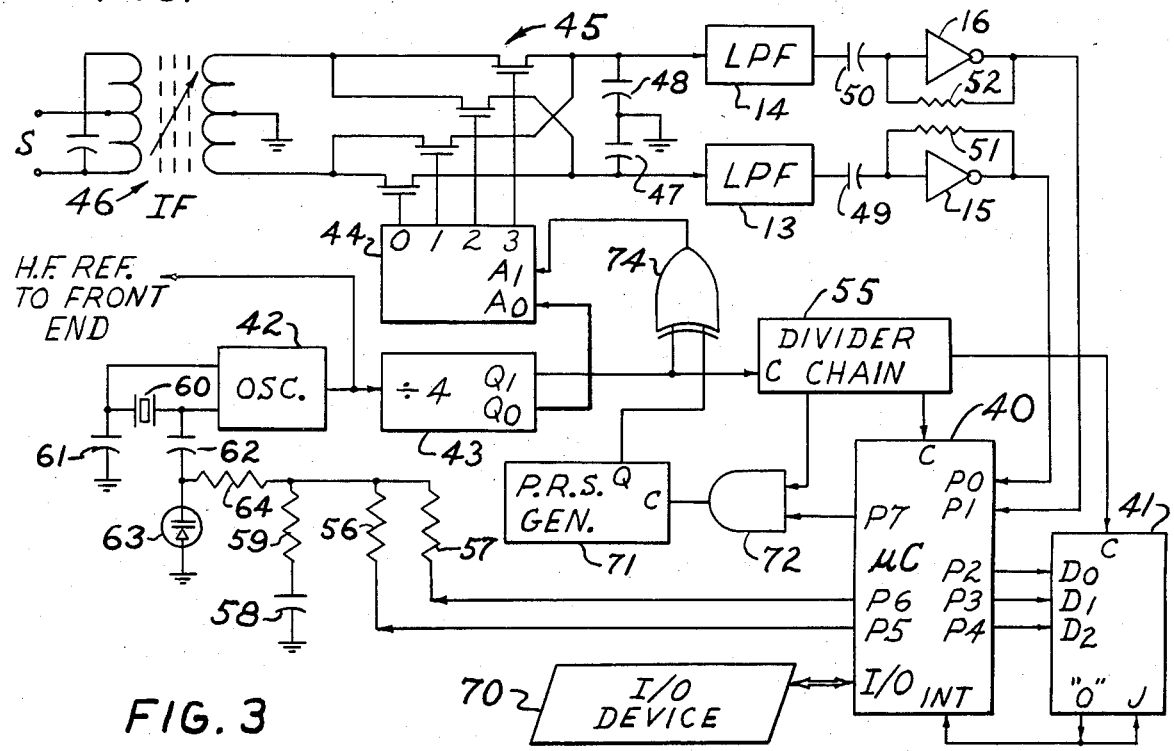
FIG. 3 is a schematic diagram of an embodiment of the invention using a microcomputer interrupted at the data rate by a programmable counter, and having an improved hybrid and balanced modulator circuit and having means for permitting the reception of spread spectrum transmissions.

Turning now to FIG. 3, there is shown another embodiment of the invention using a microcomputer (40) executing a series of instructions in its memory to perform the offset QPSK demodulation method of the present invention. A programmable timer (41) shown as a presettable down counter functions as the data clock (20). A crystal-controlled oscillator (42) regenerates the suppressed carrier, which may be used as a high frequency reference for the "front end" of a digital radio receiver using the demodulator in FIG. 3. The oscillator output is divided by four in a two-stage binary counter (43) and the two binary state outputs $Q_1$, $Q_0$ are fed to a decoder (44). The decoded states 0, 1, 2, 3 sequentially enable respective individual switching elements generally designated (45) functioning as inphase and quadraphase balanced modulators. The switching elements are preferably MOS FETS or CMOS transmission gates. The switching elements (45) are wired in ring fashion, bridging the center-tapped secondary of a tuned IF transformer generally designated (46), the center tap being at signal ground. The IF transformer receives the QPSK signal S from the front-end or down converter of the digital radio receiver, or from another source such as a coaxial cable. Also bridging the ring of switching elements is a pair of capacitors (47), (48) shunting the inphase and quadraphase balanced modulator outputs to signal ground, thereby suppressing the higher order product signals by holding the values "sampled" by the switching elements. The inphase and quadraphase low pass filters (13), (14) serve as data symbol reconstruction filters and also provide the primary selectivity characteristic of the digital radio receiver. In a digital radio receiver, the low pass filters (13), (14) preferably have low noise, some gain coincident with their selectivity, and good power supply isolation. Active R-C filters employing FET or CMOS operational amplifiers are recommended. The limiters (15), (16) are shown in FIG. 3 as high gain inverting amplifiers. To achieve good limiter symmetry, the input threshold, for example a positive op-amp input, should be at the midpoint of the high and low saturated output levels. Then the DC blocking or AC coupling capacitors (49), (50) working in conjunction with the feedback biasing resistors (51), (52) assure that the duty cycle of the hardlimited $I_S$ and $Q_S$ signals is 50%. Good limiter symmetry and relatively equal phase delays through the I and Q channels are desired since the carrier phase and the data or symbol phase information in effect "resides" or is encoded in the time positions of the transitions in the $I_S$ and $Q_S$ signals.

The observed limiter symmetry is further improved by insuring that the DC values of the I and Q signals are zero by employing appropriate coding techiques at the transmitter. If the transmitted data is differentially encoded to avoid carrier phase lock-point ambiguity, then the DC components in the I and Q signals may be set to zero by the periodic insertion of data bits set to predeterminable, data dependent logical values for the sole purpose of eliminating DC components. The transmitted data $D_0, D_1, D_2 \ldots$ may be encoded as inphase and quadraphase data according to:

$$I_{n+1} = D_{2n} \oplus I_n$$

$$Q_{n+1} = D_{2n+1} \oplus Q_n$$

The encoded data may be differentially decoded in the circuit of FIG. 1 by the transition detecting flip-flops (35), (36) and exclusive-OR gates (37), (38). The differentially decoded data (DIF. DEC. DATA) is obtained in a serial stream by combining the output of gate (37) (Idif.) with the output of gate (38) in an OR gate (39). If one data bit in 16 is selected as an inserted data bit to eliminate the DC values, the inserted bits are, for example, $D_{30}$, $D_{31}$, $D_{62}$, $D_{63}$, ..., $D_{n(32)-2}$, $D_{n(32)-1}$, ... Running sums of the DC values for I and Q are calculated as:

$$\sum_{i=0}^{16n-2} VAL(I_i) \text{ and } \sum_{i=0}^{16n-2} VAL(Q_i)$$

where VAL(logic high)=1 and VAL(logic low)=1. The next inserted data bits $D_{n(32)-2}$ and $D_{n(32)-1}$ are at first set to logic low and the partial sums $$\sum_{i=16n-1}^{16(n+1)-2} VAL(I_i) \text{ and } \sum_{i=16n-1}^{16(n+1)-2} VAL(Q_i)$$

are calculated. If either of the partial sums has the same sign or polarity as the respective running sum, then the respective inserted data bit is set to logic high and the I and Q data are reencoded for transmission, or equivalently the following encoded I and Q bits are inverted, thereby preventing the magnitude of the next running sum from exceeding a value of 16. It is assumed, of course, that a memory buffer or shift register of approximately 32 bits is used to temporarily store the data bits or encoded bits until the partial sums can be evaluated. This encoding procedure, used to generate the I and Q data which modulate the suppressed inphase and quadraphase carriers at the transmitter, is easily performed by a microcomputer. An exemplary computer program for a Motorola MC6800 microprocessor is listed in Table I appended to the specification. The program assumes that a Motorola 6820 PIA has a control register at memory location FOOF and a data direction and input/output register at memory location FOOE. The computer program receives the data on the I/O port bit P7 upon interrupt, and the I and Q channel data are outputted on bits P0 and P1, respectively. A frame sync pulse may also be received on bit P6 in order that the inserted data bits are the last two data bits in the 32 bit frame.

Returning to FIG. 3, the outputs of the limiters (15), (16) are fed to the inputs P0, P1 of the microcomputer (40). The microcomputer as well as the programmable counter (41) are clocked at appropriate frequencies from a divider chain (55) excited by the oscillator (42), an initial division by four being performed by the two-stage binary counter (43). The microcomputer (40) is periodically interrupted at the data rate by the zero signal ("0") form the programmable counter (41). Coincident with the interrupt, the zero signal ("0") presets the programmable counter (41) via the jam input (J) to an initial state specified in part by a three-bit number ($D_2$, $D_1$, $D_0$) assumed to be the least significant portion of the binary number specifying the value of the intital state. The programmable counter generates the desired data rate, for example, when the three-bit number has a value of 3. Then the microcomputer can modulate the frequency or phase of the programmable counter functioning as the data clock by the value of the three-bit number on its outputs P4, P3, P2. The number has a value of 3, for example, when the "tristate" data phase control signal is inactive, and a value of 4 to 2 for an active low or high, respectively, the higher number generating the lower data clock frequency. It is also desirable for the bandwidth of the data phase-locked loop to be relatively wide for acquiring the QPSK signal and relatively narrow for maintaining phase-lock. For this purpose values of 6 or 0 for an active low or high are specified by the microcomputer on the outputs P4, P3, P2 during acquisition, until phase-lock is detected. Phase-lock may be detected, for example, by the reception of a predetermined frame synchronization code in the received data, or alternatively by using error detecting coding and presuming that phase-lock has occurred when sufficiently low error rates are indicated.

The microcomputer (40) also has two tristate outputs P6, P5 used as carrier phase control outputs. Tristate outputs are available, for example, from a Motorola PIA part number 6820. Alternatively, a tristate output can be obtained from two logic outputs, one for asserting a logic high and the other for asserting a logic low, by combining the outputs through two diodes, the diodes both being back biased or "off" when the tristate output is inactive and neither logic state is asserted. Two tristate outputs P5, P6 are used so that the carrier phase-locked loop will have a relatively narrow bandwidth when one output is used, and a relatively wide bandwidth when the other or both outputs are used. The outputs can be used simultaneously, for example, for sweeping across a wide carrier frequency range. In the sweep mode for carrier acquisition, one output provides the phase control output $\phi_C$, while the other is asserted high or low periodically or intermittently. The relative loop bandwidths for the outputs P5, P6 are set by the values of respective current limiting resistors (56), (57). The current through the resistors is in part integrated by a "type II" loop filter capacitor (58), the stability of the carrier acquisition loop being assured by a phase lead inducing resistor (59). The center frequency of the oscillator (42) is set by a crystal or resonator (60) and to some extent by capacitors (61), (62) connected to the crystal leads. A varactor (63) pulls the crystal frequency as a function of its bias voltage supplied through a resistor (64) from the loop filter components (56), (57), (58), (59).

The microcomputer (40) compares the received data to a predetermined frame synchronization code, and once frame sync is established the data following the frame sync code is available for display or control functions through a suitable input/output or I/O device (70) such as an alphanumeric display.

Since the digital receiver in FIG. 3 is a synchronous or linear receiver, it can be adapted to receive spread-spectrum transmissions by correlating the received singal S by a copy of the pseudorandom code used at the transmitter to spread the spectrum of the signal S. The predetermined code is clocked out of a pseudorandom sequence generator (71) when enabled by a gate (72) activated by the output P7 of the microcomputer (40). The pseudorandom sequence is encoded into the local inphase and quadraphase carriers via an exclusive-OR gate (74) which has the effect of phase shifting the carriers by 180 degrees.

It should be noted that the microcomputer (40) simulates the operation of the demodulator in FIG. 1 on a timed-interrupt basis. This frees the executive program or foreground routines for servicing the I/O device (70). An exemplary microcomputer program for a Motorola 6800 microprocessor is listed in Table II appended to the specification. The interrupt routine DECODE determines whether the current CLOCK transition in FIG. 2 is rising or falling, as indicated by a software switch POL, and performs the logical operations coincident with that polarity of transition. The computer program assumes that the I/O port P7, P6, . . . , P0 is a Motorola 6820 PIA having a control B register at address FOOF and a data direction and I/O register B at address FOOE. The tristate outputs P5, P6 are conditionally set inactive by setting bits 5 and 6 in the data direction register to zero, thereby designating P5 and P6 as inputs. The interrupt routine also differentially decodes the received data and correlates the decoded data with a 530F frame synchronization code. When the frame sync code is detected, a flag LOCK is set on and the decoded data is loaded into a 32-byte buffer at addresses 0000 to 0020. When the buffer is full a flag FULL is set. The flag LOCK is cleared if the frame sync code in not periodically received each time after the buffer is filled.

Although an external programmable counter or timer (41) is shown in FIG. 3, the programmable counter may be simulated by a fast interrupt procedure executed by the microcomputer (40) if the data rate is relatively slow compared to the execution speed of the microcomputer. An exemplary fast interrupt procedure CLOCK is included at the end of the listing in Table II appended to the specification. For each fast interrupt, a memory location COUNT representing the state of the programmable counter (41) is decremented. If the result is zero, the memory location COUNT is preset to the desired initial state and the data rate interrupt DECODE is executed. It should be noted that the data rate interrupt DECODE may itself be interrupted by subsequent fast interrupts.

In view of the foregoing, an offset QPSK demodulator and receiver providing differentially decoded data and clock and carrier phase control signals has been described that is suitable for low cost integrated circuit implementation. A low data rate embodiment using a microcomputer has also been described. Although the illustrative embodiments have been presented in the context of radio communications, it is evident that the present invention can be used to double the data rate wherever phase shift keying (PSK) is presently used, so that the invention is universal in applications involving data storage or transmission in other than baseband format. Thus the present invention is useful with alternative data storage or transmission mediums such as coaxial cable, microwave, infrared, fiber optic, ultrasonic, and magnetic or optical disc or tape.

TABLE I

Motorola 6800 Microprocessor Program
For Offset QPSK Encoder

RAM REGISTERS

| Addr | Name | Description |
|---|---|---|
| 0001 | OUTPUT | COPY OF OUTPUT |
| 0002 | COUNT | STATE COUNTER FOR THE ENCODER |
| 0003 | IRUNSUM | I RUNNING SUM |
| 0004 | IPSUM | I PARTIAL SUM |
| 0005 | ISHIFT1 | I CHANNEL SHIFT REGISTER |
| 0006 | ISHIFT2 | |
| 0007 | ISWITCH | I POLARITY SWITCH |
| 0008 | QRUNSUM | Q RUNNING SUM |
| 0009 | QPSUM | Q PARTIAL SUM |
| 000A | QSHIFT1 | Q CHANNEL SHIFT REGISTER |
| 000B | QSHIFT2 | |
| 000C | QSWITCH | Q POLARITY SWITCH |

INSTRUCTIONS

| Addr | Op | Operand | Label | Mnem | Arg | Comment |
|---|---|---|---|---|---|---|
| 0200 | 7F | F00F | NMI | CLR | CNTREGB | SET UP PIA FOR |
| 0203 | 86 | 03 | | LDA A | #$03 | DATA INTO P7, FRAME |
| 0205 | B7 | F00E | | STA A | DDRB | SYNC PULSE INTO P6, |
| 0208 | 86 | 04 | | LDA A | #$04 | QDATA OUT P1, AND |
| 020A | B7 | F00F | | STA A | CNTREGB | IDATA OUT P0. |
| 020D | B6 | F00E | | LDA A | ORB | |
| 0210 | D6 | 01 | | LDA B | OUTPUT | PERFORM INPUT/OUTPUT |
| 0212 | F7 | F00E | | STA B | ORB | OPERATIONS |
| 0215 | 16 | | | TAB | | |
| 0216 | 84 | 40 | | AND A | #$40 | RESET STATE COUNTER |
| 0218 | 27 | 03 | | BEQ | SKIPA | IF FRAME SYNC PULSE |
| 021A | 7F | 0002 | | CLR | COUNT | IS PRESENT |
| 021D | 7C | 0002 | SKIPA | INC | COUNT | |
| 0220 | C4 | 80 | | AND B | #$80 | MASK OUT INPUT DATA BIT |
| 0222 | 96 | 02 | | LDA A | COUNT | CHECK WHETHER DATA BIT |
| 0224 | 44 | | | LSR A | | GOES INTO I CHANNEL |
| 0225 | 24 | 38 | | BCC | QENCODE | OR Q CHANNEL |
| 0227 | 77 | 0005 | IENCODE | ASR | ISHIFT1 | SHIFT IN DIFFERENTIALLY |
| 022A | D8 | 05 | | EOR B | ISHIFT1 | ENCODED DATA BIT; |
| 022C | 2B | 05 | | BMI | IINC | INC OR DEC IPSUM |
| 022E | 7A | 0004 | IDEC | DEC | IPSUM | DEPENDING ON WHETHER |
| 0231 | 20 | 03 | | BRA | SKIPB | THE DIFFERENTIALLY |
| 0233 | 7C | 0004 | IINC | INC | IPSUM | ENCODED DATA BIT IS |
| 0236 | D7 | 05 | SKIPB | STA B | ISHIFT1 | 1 OR 0, RESPECTIVELY |
| 0238 | 76 | 0006 | | ROR | ISHIFT2 | |
| 023B | 49 | | | ROL A | | INVERT THE BIT SHIFTED |
| 023C | 98 | 07 | | EOR A | ISWITCH | OUT IF NECESSARY AND |
| 023E | 76 | 0001 | | ROR | OUTPUT | |

TABLE I-continued

Motorola 6800 Microprocessor Program For Offset QPSK Encoder

| | | | | | |
|---|---|---|---|---|---|
| 0241 | 46 | | RORA | | SHIFT IN NEW OUTPUT |
| 0242 | 79 | 0001 | ROL | OUTPUT | BIT |
| 0245 | 96 | 02 | LDA A | COUNT | TEST IF IT IS TIME |
| 0247 | 81 | 1E | CMP A | #$1E | TO CHECK THE |
| 0249 | 22 | 01 | BHI | SKIPC | POLARITY OF ISWITCH |
| 024B | 3B | | RTI | | |
| 024C | 7F | 0007 SKIPC | CLR | ISWITCH | |
| 024F | 96 | 04 | LDA A | IPSUM | COMPARE SIGNS OF |
| 0251 | 16 | | TAB | | IPSUM AND IRUNSUM |
| 0252 | 98 | 03 | EOR A | IRUNSUM | |
| 0254 | 2B | 04 | BMI | SKIPD | IF SIGNS ARE THE SAME, |
| 0256 | 73 | 0007 | COM | ISWITCH | ISWITCH IS SET TO |
| 0259 | 50 | | NEG B | | $FF AND IPSUM IS |
| 025A | DB | 03 SKIPD | ADD B | IRUNSUM | NEGATED BEFORE |
| 025C | D7 | 03 | STA B | IRUNSUM | IRUNSUM IS UPDATED |
| 025E | 3B | | RTI | | |
| 025F | 77 | 000A QENCODE | ASR | QSHIFT1 | SHIFT IN DIFFERENTIALLY |
| 0262 | D8 | 0A | EOR B | QSHIFT1 | ENCODED DATA BIT; |
| 0264 | 2B | 05 | BMI | QINC | INC OR DEC QPSUM |
| 0266 | 7A | 0009 QDEC | DEC | QPSUM | DEPENDING ON WHETHER |
| 0269 | 20 | 03 | BRA | SKIPE | THE DIFFERENTIALLY |
| 026B | 7C | 0009 QINC | INC | QPSUM | ENCODED BIT IS 1 OR 0. |
| 026E | D7 | 0A SKIPE | STA B | QSHIFT1 | RESPECTIVELY |
| 0270 | 76 | 000B | ROR | QSHIFT2 | |
| 0273 | 49 | | ROL A | | ADJUST FOR Q OUTPUT |
| 0274 | 49 | | ROL A | | BIT POSITION |
| 0275 | 98 | 0C | EOR A | QSWITCH | INVERT OUTPUT BIT IF |
| 0277 | 98 | 01 | EOR A | OUTPUT | NECESSARY AND MASK |
| 0279 | 84 | 02 | AND A | #$02 | THE OUTPUT BIT |
| 027B | 98 | 01 | EOR A | OUTPUT | INTO THE TEMPORARY |
| 027D | 97 | 01 | STA A | OUTPUT | OUTPUT REGISTER |
| 027F | 96 | 02 | LDA A | COUNT | TEST IF IT IS TIME TO |
| 0281 | 81 | 1F | CMP A | #$1F | CHECK THE POLARITY |
| 0283 | 22 | 01 | BHI | SKIPF | OF QSWITCH |
| 0285 | 3B | | RTI | | |
| 0286 | 7F | 000C SKIPF | CLR | QSWITCH | |
| 0289 | 96 | 09 | LDA A | QPSUM | COMPARE SIGNS OF |
| 028B | 16 | | TAB | | QPSUM AND QRUNSUM |
| 028C | 98 | 08 | EOR A | QRUNSUM | IF THE SIGNS ARE THE |
| 028E | 2B | 04 | BMI | SKIPG | SAME, SET QSWITCH |
| 0290 | 73 | 000C | COM | QSWITCH | TO $FF AND QPSUM |
| 0293 | 50 | | NEG B | | IS NEGATED BEFORE |
| 0294 | DB | 08 SKIPG | ADD B | QRUNSUM | QRUNSUM IS UPDATED |
| 0296 | D7 | 08 | STA B | QRUNSUM | |
| 0298 | 4F | | CLR A | | BEGIN NEW FRAME |
| 0299 | 97 | 02 | STA A | COUNT | CYCLE BY CLEARING |
| 029B | 97 | 04 | STA A | IPSUM | IPSUM, QPSUM, AND |
| 029D | 97 | 09 | STA A | QPSUM | COUNT |
| 029F | 3B | | RTI | | |

TABLE II

Motorola 6800 Microprocessor Program For Offset QPSK Demodulator/Decoder

RAM REGISTERS

| | | |
|---|---|---|
| 0000 | BUFFER | 32-BYTE RECEIVED DATA BUFFER |
| 0001 | | |
| 0020 | | |
| 0021 | POL | MSB IS VALUE OF THE DATA CLOCK |
| 0022 | LOCK | SYNC CODE DETECTED (RESET PROGRAM MUST CLEAR) |
| 0023 | FULL | BUFFER IS FULL |
| 0024 | SLOWCLK | EQU $18 FOR ACQUISITION, $10 FOR LOCK |
| 0025 | FASTCLK | EQU $00 FOR ACQUISITION, $08 FOR LOCK |
| 0026 | OSCMASK | EQU $BC FOR ACQUISITION, $DC FOR LOCK |
| 0027 | ISAVE | Q OUTPUT OF FLIP-FLOP (35) |
| 0028 | IDATA | Q OUTPUT OF FLIP-FLOP (21) |
| 0029 | ICONTROL | Q OUTPUT OF FLIP-FLOP (23) |
| 002A | QSAVE | Q OUTPUT OF FLIP-FLOP (36) |
| 002B | QDATA | Q OUTPUT OF FLIP-FLOP (22) |
| 002C | QCONTROL | Q OUTPUT OF FLIP-FLOP (24) |
| 002D | SHIFT2 | MS BYTE FOR FRAMING SHIFT REGISTER |
| 002E | SHIFT1 | LS BYTE FOR FRAMING SHIFT REGISTER |
| 002F | BITPTR | POINTER FOR BIT POSITION IN THE BYTE |
| 0030 | COUNT | STATE OF COUNTER (41) FOR FAST INTERRUPT |
| 0031 | OUTCOPY | COPY OF OUTPUT FOR FAST INTERRUPT |
| 0032 | BUFPTR | MS BYTE OF POINTER FOR DATA BUFFER |
| 0033 | BUFPTRL | LS BYTE OF POINTER FOR DATA BUFFER |

INSTRUCTIONS

TABLE II-continued
Motorola 6800 Microprocessor Program
For Offset QPSK Demodulator/Decoder

| | | | | | |
|---|---|---|---|---|---|
| 0200 | B6 | F00E | DECODE | LDA A ORAREGB | READ I/O PORT |
| 0203 | 73 | 0021 | | COM POL | CHANGE AND TEST |
| 0206 | 2B | 30 | | BMI FALLING | POLARITY FLAG |
| 0208 | D6 | 28 | RISING | LDA B IDATA | ISAVE←IDATA |
| 020A | D7 | 27 | | STA B ISAVE | (FLIP-FLOP 35) |
| 020C | 16 | | | TAB | |
| 020D | C4 | 01 | | AND B #$01 | IDATA←P0 |
| 020F | D7 | 28 | | STA B IDATA | (FLIP-FLOP 21) |
| 0211 | 84 | 02 | | AND A #$02 | QCONTROL←P1 |
| 0213 | 44 | | | LSR A | (FLIP-FLOP 24) |
| 0214 | 97 | 2C | | STA A QCONTROL | |
| 0216 | D8 | 27 | | EOR B ISAVE | (EXCLUSIVE-OR 37) |
| 0218 | 27 | 4E | | BEQ NOTRANS | |
| 021A | 96 | 29 | TRANSI | LDA A ICONTROL | |
| 021C | 16 | | | TAB | |
| 021D | D8 | 27 | | EOR B ISAVE | (EXCLUSIVE-OR 27) |
| 021F | 27 | 04 | | BEQ SLOWIC | |
| 0221 | D6 | 25 | FASTIC | LDA B FASTCLK | |
| 0223 | 20 | 02 | | BRA OICHK | (TRISTATE 31) |
| 0225 | D6 | 24 | SLOWIC | LDA B SLOWCLK | |
| 0227 | 98 | 2B | OICHK | EOR A QDATA | (EXCLUSIVE-OR 25) |
| 0229 | 26 | 02 | | BNE ACTIVIO | |
| 022B | CA | 60 | FASTIO | ORA B #$60 | (TRISTATE 29) |
| 022D | 7F | F00F | ACTIVIO | CLR CNTREGB | SET I/O CONTROL REG. |
| 0230 | 96 | 26 | | LDA A OSCMASK | B TO ACTIVATE LOCAL |
| 0232 | B7 | F00E | | STA A DDRREGB | OSC. PHASE OUTPUT |
| 0235 | 0D | | | SEC | SET CARRY SINCE |
| 0236 | 20 | 3B | | BRA OUT | DIFF. DATA BIT =1 |
| 0238 | D6 | 2B | FALLING | LDA B QDATA | QSAVE←QDATA |
| 023A | D7 | 2A | | STA B QSAVE | (FLIP-FLOP 36) |
| 023C | 16 | | | TAB | ICONTROL←P0 |
| 023D | C4 | 01 | | AND B #$01 | (FLIP-FLOP 22) |
| 023F | D7 | 29 | | STA B ICONTROL | QDATA←P1 |
| 0241 | 84 | 02 | | AND A #$02 | (FLIP-FLOP 25) |
| 0243 | 44 | | | LSR A | |
| 0244 | 97 | 2B | | STA A QDATA | |
| 0246 | 98 | 2A | | EOR A QSAVE | (EXCLUSIVE-OR 38) |
| 0248 | 27 | 1E | | BEQ NOTRANS | |
| 024A | 96 | 2C | TRANSQ | LDA A QCONTROL | |
| 024C | 16 | | | TAB | |
| 024D | D8 | 2A | | EOR B QSAVE | (EXCLUSIVE-OR 28) |
| 024F | 27 | 04 | | BEQ SLOWQC | |
| 0251 | D6 | 25 | FASTQC | LDA B FASTCLK | |
| 0253 | 20 | 02 | | BRA OQCHK | (TRISTATE 32) |
| 0255 | D6 | 24 | SLOWQC | LDA B SLOWCLK | |
| 0257 | 98 | 28 | OQCHK | EOR A IDATA | (EXCLUSIVE-OR 26) |
| 0259 | 27 | 02 | | BEQ SLOWQO | |
| 025B | CA | 60 | FASTQO | ORA B #$60 | (TRISTATE 30) |
| 025D | 7F | F00F | SLOWQO | CLR CNTREGB | SET CONTROL REG. B |
| 0260 | 96 | 26 | | LDA A OSCMASK | TO ACTIVATE LOCAL |
| 0262 | B7 | F00E | | STA A DDRREGB | OSC. PHASE OUTPUT |
| 0265 | 0D | | | SEC | SET CARRY SINCE |
| 0266 | 20 | 0B | | BRA OUT | DIFF. DATA BIT =1 |
| 0268 | C6 | 0C | NOTRANS | LDA B #$0C | SET CLOCK AT CENTER |
| 026A | 7F | F00F | | CLR CNTREGB | FREQ. & SET LOCAL |
| 026D | 86 | 9C | | LDA A #$9C | OSC. TRISTATES |
| 026F | B7 | F00E | | STA A DDRREGB | (29, 30) OFF |
| 0272 | 0C | | | CLC | DIFF. DATA =0 |
| 0273 | 86 | 04 | OUT | LDA A #$04 | OUTPUT CLOCK RESET |
| 0275 | B7 | F00F | | STA A CNTREGB | STATE AND LOCAL OSC. |
| 0278 | F7 | F00E | | STA B ORAREGB | IF ENABLED BY DDRREGB |
| 027B | D7 | 31 | | STA B OUTCOPY | COPY FOR FAST INTERRUPT |
| 027D | 96 | 2E | SHIFT | LDA A SHIFT1 | SHIFT DIFF. DECODED DATA |
| 027F | 49 | | | ROL A | 16-BIT SHIFT REGISTER |
| 0280 | 97 | 2E | | STA A SHIFT1 | FOR FRAME SYNC |
| 0282 | D6 | 2D | | LDA B SHIFT2 | CORRELATION AND |
| 0284 | 59 | | | ROL B | WORD FRAMING |
| 0285 | D7 | 2D | | STA B SHIFT2 | |
| 0287 | 7D | 0022 | | TST LOCK | |
| 028A | 26 | 21 | | BNE FRAME | IF NOT ALREADY LOCKED, |
| 028C | C1 | 53 | CORREL | CMP B #$53 | CORRELATE DATA WITH |
| 028E | 27 | 01 | | BEQ SKIPA | $530F FRAME |
| 0290 | 3B | | | RTI | SYNC CODE |
| 0291 | 81 | 0F | SKIPA | CMP A #$0F | |
| 0293 | 27 | 01 | | BEQ SYNCDET | |
| 0295 | 3B | | | RTI | |
| 0296 | 73 | 0022 | SYNCDET | COM LOCK | SET LOCK FLAG |
| 0299 | 86 | 08 | | LDA A #$08 | INITIALIZE BIT POINTER |
| 029B | 97 | 2F | | STA A BITPTR | AND INDEX REG. USED |
| 029D | CE | 0000 | | LDX #BUFFER | AS THE BYTE POINTER |

TABLE II-continued

Motorola 6800 Microprocessor Program
For Offset QPSK Demodulator/Decoder

| 02 0 | DF | 32 | | STX | BUFPTR | SAVED IN BUFPTR |
|------|----|----|----|-----|--------|-----------------|
| 02A2 | 97 | 25 | | STA A | FASTCLK | SET LOCK VALUES FOR |
| 02A4 | 86 | 10 | | LDA A | #$10 | HIGH AND LOW CLOCK |
| 02A6 | 97 | 24 | | STA A | SLOWCLK | FREQUENCIES AND |
| 02A8 | 86 | DC | | LDA A | #$DC | OSCILLATOR MASK |
| 02AA | 97 | 26 | | STA A | OSCMASK | |
| 02AC | 3B | | | RTI | | |
| 02AD | 7A | 002F | FRAME | DEC | BITPTR | CHECK FOR FILLED |
| 02B0 | 27 | 01 | | BEQ | SKIPB | |
| 02B2 | 3B | | | RTI | | |
| 02B3 | DE | 32 | SKIPB | LDX | BUFPTR | RESTORE INDEX REG. |
| 02B5 | 8C | 0019 | | CPX | #$0019 | SET FULL FLAG |
| 02B8 | 26 | 03 | | BNE | SKIPC | NOW THAT |
| 02BA | 73 | 0023 | | COM | FULL | THE BUFFER |
| 02BD | 8C | 0021 | SKIPC | CPX | #$0021 | IS BEING FILLED |
| 02C0 | 27 | 0A | | BEQ | FRMCHK | |
| 02C2 | A7 | 00 | | STA A | X,0 | LOAD BUFFER |
| 02C4 | 08 | | | INX | | ADVANCE BUFFER |
| 02C5 | DF | 32 | | STX | BUFPTR | POINTER |
| 02C7 | 86 | 08 | | LDA A | #$08 | |
| 02C9 | 97 | 2F | | STA A | BITPTR | SAVE BIT POINTER |
| 02CB | 3B | | | RTI | | |
| 02CC | 7F | 0023 | FRMCHK | CLR | FULL | LOOK FOR NEXT FRAME |
| 02CF | 7F | 0022 | | CLR | LOCK | SYNC CODE |
| 02D2 | 36 | | | PSH A | | SAVE FIRST BYTE |
| 02D3 | 86 | 18 | | LDA A | #$18 | TEMPORARILY SET |
| 02D5 | 97 | 24 | | STA A | SLOWCLK | ACQUISITION VALUES |
| 02D7 | 86 | 00 | | LDA A | #$00 | FOR CLOCK AND OSC. |
| 02D9 | 97 | 25 | | STA A | FASTCLK | IN CASE FRAME SYNC |
| 02DB | 86 | BC | | LDA A | #$BC | IS LOST |
| 02DD | 97 | 26 | | STA A | OSCMASK | |
| 02DF | 32 | | | PUL A | | RESTORE BYTE IN A REG. |
| 02E0 | 02 | AA | | BRA | CORREL | FOR FRAME SYNC CHECK |
| 02E2 | 7A | 0030 | CLOCK | DEC | COUNT | FAST INTERRUPT |
| 02E5 | 27 | 01 | | BEQ | SKIPD | PROCEDURE SIMULATING |
| 02E7 | 3B | | | RTI | | COUNTER (41) |
| 02E8 | 96 | 31 | SKIPD | LDA A | OUTCOPY | |
| 02EA | 84 | 1C | | AND A | #$1C | MASK P4, P3, P2 |
| 02EC | 44 | | | LSR A | | |
| 02ED | 44 | | | LSR A | | SET CLOCK |
| 02EE | 8B | 18 | | ADD A | #$18 | FREQUENCY |
| 02F0 | 97 | 30 | | STA A | COUNT | JUMP TO DECODER AT |
| 02F1 | 7E | 0200 | | JMP | DECODE | DATA RATE |

What is claimed is:

1. An offset QPSK receiver for receiving an offset QPSK signal including data at a predetermined data rate modulated on a suppressed carrier wherein the offset QPSK signal is approximately the sum of a transmitted inphase data stream multiplied by a first suppressed modulating singal at approximately the frequency of the suppressed carrier plus a transmitted quadraphase data stream mutiplied by a second suppressed modulating signal at approximately the frequency of the suppressed carrier and approximately in phase quadrature with said first suppressed modulating signal, the transmitted inphase data stream having a substantial proportion of data transitions offset from the data transitions in the transmitted quadraphase data stream, said offset QPSK receiver comprising, in combination, (a) means for effectively multiplying the offset QPSK signal by a locally-generated first modulating signal at approximately the frequency of the suppressed carrier and a locally-generated second modulating signal at approximately the frequency of the suppressed carrier and approximately in phase quadrature with said locally-generated first modulating signal, the phase of said locally-generated modulating signals relative to the phase of the suppressed modulating signals being responsive to a carrier phase control signal, to thereby generate respective inphase and quadraphase signals from said offset QPSK signal responsive to said carrier phase control signal, (b) respective means for generating hard limited inphase and quadraphase signals from said inphase and quadraphase signals, (c) a data clock for generating a periodic data clocking signal in response to a data phase control signal, and (d) digital circuit means responsive to said respective hard limited inphase and quadraphase signals and said data clocking signal for
 (1) obtaining respective received inphase and quadraphase data streams,
 (2) generating said data phase control signal so that said received data streams become substantially phase synchronized to said transmitted data streams, and
 (3) generating said carrier phase control signal so that said locally-generated modulating signals become substantially phase synchronized to said suppressed modulating signals and so that said carrier phase control signal is unresponsive to the amplitudes of the inphase and quadraphase signals and thereby unresponsive to the amplitude of the offset QPSK signal.

2. The offset QPSK receiver as claimed in claim 1, wherein said digital circuit means includes means for sampling the hard limited inphase and quadraphase signals substantially simultaneously and approximately at the data rate, and means for generating the carrier phase control signal from the samples of the hard limited inphase and quadraphase signals.

3. An offset QPSK receiver for receiving an offset QPSK signal including data at a predetermined data rate modulated on a suppressed carrier wherein the offset QPSK signal is approximately the sum of a transmitted inphase data stream multiplied by a first suppressed modulating singal at approximately the frequency of the suppressed carrier plus a transmitted quadraphase data stream multiplied by a second suppressed modulating signal at approximately the frequency of the suppressed carrier and approximately in phase quadrature with said first suppressed modulating signal, the transmitted inphase data stream having a substantial proportion of data transitions offset from the data transitions in the transmitted quadraphase data stream, said offset QPSK receiver comprising, in combination,
  (a) means for effectively multiplying the offset QPSK signal by a locally-generated first modulating signal at approximately the frequency of the suppressed carrier and a locally-generated second modulating signal at approximately the frequency of the suppressed carrier and approximately in phase quadrature with said locally-generated first modulating signal, the phase of said locally-generated modulating signals relative to the phase of the suppressed modulating signals being responsive to a carrier phase control signal, to thereby generate respective inphase and quadraphase signals from said offset QPSK signal responsive to said carrier phase control signal,
  (b) respective means for generating hard limited inphase and quadraphase signals from said inphase and quadraphase signals,
  (c) a data clock for generating a periodic data clocking signal in response to a data phase control signal, and
  (d) circuit means responsive to said respective hard limited inphase and quadraphase signals and said data clocking signal for
    (1) obtaining respective received inphase and quadraphase data streams,
    (2) generating said data phase control signal so that said received data streams become substantially phase synchronized to said transmitted data streams, and
    (3) generating said carrier phase control signal so that said locally-generated modulating signals become substantially phase synchronized to said suppressed modulating signals,
  wherein the carrier phase control signal is a tristate signal active upon the occurrence of transitions in the inphase data stream and upon transitions in the quadraphase data stream.

4. A PSK receiver for receiving a PSK signal including data at a predetermined data rate modulated on a suppressed carrier, said PSK receiver comprising, in combination,
  (a) means for effectively multiplying the PSK signal by a locally-generated first modulating signal at approximately the frequency of the suppressed carrier and a locally-generated second modulating signal at approximately the frequency of the suppressed carrier and approximately in phase quadrature with said locally-generated first modulating signal, the phase of said locally-generated modulating signals relative to the phase of the suppressed carrier being responsive to a carrier phase control signal, to thereby generate respective inphase and quadraphase signals from said PSK signal responsive to said carrier phase control signal,
  (b) respective means for generating hard limited inphase and quadraphase signals from said inphase and quadraphase signals,
  (c) a data clock for generating a periodic data clocking signal in response to a data phase control signal, and
  (d) circuit means responsive to said respective hard limited inphase and quadraphase signals and said data clocking signal for
    (1) obtaining a received data stream corresponding to said data modulated on said suppressed carrier,
    (2) generating said data phase control signal so that said received data stream becomes substantially phase synchronized to said transmitted data stream, and
    (3) generating said carrier phase control signal so that said locally-generated modulating signals become substantially phase synchronized to said suppressed carrier,
  wherein the means for effectively multiplying the PSK signal comprise a transformer having a primary coil excited by the PSK signal, a center-tapped secondary coil having the center tap substantially at signal ground, and a ring of four switching elements bridging the secondary coil of the transformer, the switching elements being individually and sequentially enabled at approximately the suppressed carrier frequency, the ring of switching elements thereby providing inphase and quadraphase balanced modulator outputs.

5. The PSK receiver as claimed in claim 4, further comprising DC blocking capacitors in the inphase and quadraphase channels between the balanced modulator outputs and the respective hard limited signal outputs.

6. The PSK receiver as claimed in claim 4, further comprising a four-state binary decoder providing the four signals for sequentially enabling the switching elements, a pseudorandom binary sequence generator, and an exclusive-OR gate for modulating the most significant bit input to the binary decoder by the pseudorandom binary sequence.

7. The PSK receiver as claimed in claim 4, wherein said circuit means includes a microcomputer programmed to provide means for receiving the hard limited inphase and quadraphase signals and outputting the carrier phase control signal.

8. In an offset QPSK demodulator having a local oscillator generating two outputs in phase quadrature, means for multiplying the offset QPSK signal by the two oscillator outputs and low pass filters for generating inphase and quadraphase signals from the outputs of the means for multiplying, and a data clock periodically defining sampling times at approximately the data rate of the QPSK signal, a method for generating a carrier phase control signal for adjusting the local oscillator phase to acquire the phase of the suppressed carrier in the offset QPSK signal, the method comprising the steps of:

(a) periodically sampling both the inphase signal and the quadraphase signal at approximately the sampling times defined by the data clock, (b) alternately designating the samples in the inphase channel as inphase data samples and inphase control samples, and designating the samples in the quadraphase channel coincident with the inphase data samples as quadraphase control samples, and designating the samples in the quadraphase channel coincident with the inphase control samples as quadraphase data samples, the inphase and quadraphase data samples being hard limited, and (c) generating the carrier phase control signal to change the phase of the local oscillator if a given data sample in a given one of the channels differs in logic state from the data sample in the given channel immediately preceding the given data sample, by generating the carrier phase control signal from the control sample in the channel immediately preceding the given data sample by conditionally reversing the polarity of the control sample in response to the logic state of the data sample in the channel other than the given channel sampled coincident with the control sample in the given channel, wherein the reversing occurs when the data sample in the other channel is in a first binary logic state if the other channel is the inphase channel, and in the second binary logic state opposite to the first when the other channel is the quadraphase channel.

9. The method as claimed in claim 8, wherein the control samples are hard limited.

10. The method as claimed in claim 8, further comprising the step of changing the phase of the data clock in response to a clock phase control signal if a given data sample in a given one of the channels differs in logic state from the data sample in the given channel immediately preceding the given data sample, by generating the clock phase control signal from the control sample in the given channel immediately preceding the given data sample by conditionally reversing the polarity of the control sample in response to the polarity of the transition between the given data sample and the data sample in the given channel immediately preceding the given data sample.

11. The method as claimed in claim 10, wherein the control samples are hard limited.

12. In an offset QPSK demodulator receiving inphase and quadraphase signals in respective inphase and quadraphase channels and demodulating the signals to obtain data at a predetermined data rate, said inphase and quadraphase signals encoding respective inphase and quadraphase data streams having data transitions substantially offset from each other, a phase control signal generating apparatus comprising, in combination, (a) means for sampling the inphase and quadraphase signals at approximately the data rate to alternately obtain data samples and control samples for each channel, (b) means responsive to the data samples in each channel for generating transition-indicating signals for each channel, and (c) first tristate means for comparing the data samples from each channel with the control samples from the other channel to generate a carrier phase control signal, said first tristate means being active in response to the transition-indicating signals.

13. The combination as claimed in claim 12, further comprising second tristate means for comparing the control samples from each channel with the data samples from the same channel to generate a data clock phase control signal, said second tristate means for comparing being active in response to the transition-indicating signals.

14. The combination as claimed in claim 13, wherein the second tristate means comprise an exclusive-OR gate for each channel receiving the control samples of the respective channel and the data samples of the respective channel, and tristate gating means for each channel receiving the output of the exclusive-OR gate for the channel and being enabled by the transition-indicating signal for the channel.

15. The combination as claimed in claim 13 wherein the means for sampling comprise a data clock having approximately a 50% duty cycle output cycling at approximately half the data rate, two D flip-flops clocked upon the rising transitions of the clock, one receiving the inphase signal and the other receiving the quadraphase signal, and two D flip-flops clocked upon the falling transitions of the clock output, one receiving the inphase signal and the other receiving the quadraphase signal.

16. The phase control signal generating apparatus as claimed in claim 15, wherein the means for generating the transition-indicating signal comprise, for each channel, a delaying D flip-flop and a first exclusive-OR gate comparing the input of the D flip-flop to the output of the D flip-flop, the flip-flop receiving a data sample, and the flip-flop being clocked by a clock transition polarity selected so that the transition-indicating signal from the exclusive-OR gate is active at most for half clock cycles.

17. The phase control signal apparatus as claimed in claim 12, wherein the means for sampling comprises a data clock having a 50% duty cycle output cycling at approximately half the data rate signal, two D flip-flops clocked upon the rising transitions of the clock output, one receiving the inphase signal and the other receiving the quadraphase signal, and two D flip-flops clocked upon falling transitions of the clock output, one receiving the inphase signal and the other receiving the quadraphase channel signal.

18. The phase control signal generating apparatus as claimed in claim 17, wherein the means for generating the transition-indicating signal comprise, for each channel, a delaying D flip-flop and a first exclusive-OR gate comparing the input of the D flip-flop to the output of the D flip-flop, the flip-flop receiving a data sample, and the flip-flop being clocked by a clock transition polarity selected so that the transition-indicating signal from the exclusive-OR gate is active at most for half clock cycles.

19. The combination as claimed in claim 12, wherein the first tristate means comprise an exclusive-OR gate for each channel receiving the control samples of the respective channel and data samples of the other channel, and tristate gating means for each channel for receiving the output of the exclusive OR gate for the respective channel and being enabled by the transition-indicating signal of the respective channel.

20. The combination as claimed in claim 12, further comprising means for combining the transition-indicating signals for the channels to generate a differentially decoded data stream.

* * * * *